United States Patent [19]
Osanai

[11] 4,194,704
[45] Mar. 25, 1980

[54] AUTO SHUT-OFF APPARATUS FOR CASSETTE TAPE RECORDER

[75] Inventor: Akira Osanai, Hachioji, Japan

[73] Assignee: Olympus Optical Co., Ltd., Tokyo, Japan

[21] Appl. No.: 895,703

[22] Filed: Apr. 12, 1978

[30] Foreign Application Priority Data

Apr. 27, 1977 [JP] Japan .................. 52-53867

[51] Int. Cl.² .................................. G11B 15/24
[52] U.S. Cl. .................. 242/191; 360/74.3
[58] Field of Search ........... 242/191, 189, 190, 186, 242/57, 204, 209, 201, 210; 360/74

[56] References Cited

U.S. PATENT DOCUMENTS

| | | | |
|---|---|---|---|
| 3,480,230 | 11/1969 | Hosono et al. | 242/191 |
| 3,511,451 | 5/1970 | Emmert | 242/57 X |
| 3,608,845 | 9/1971 | Kozu et al. | 242/186 |
| 3,677,493 | 7/1972 | Staar | 242/191 |

FOREIGN PATENT DOCUMENTS 2412277  9/1975  Fed. Rep. of Germany ............ 360/74

*Primary Examiner*—George F. Mautz
*Attorney, Agent, or Firm*—Lerner, David, Littenberg & Samuel

[57] ABSTRACT

An auto shut-off apparatus for a cassette tape recorder includes a pinion fixedly mounted on a capstan in coaxial manner, and a pair of rack levers carrying a rack which meshes with the pinion. The levers are movably mounted and are moved when they are driven by the pinion. The apparatus also includes a cam member which is fixedly mounted on a tape rewind or a tape supply shaft for interrupting the meshing engagement between the rack and the pinion during tape transport. When a tape end is reached to cease the rotation of the tape rewind or supply shaft, the movement of the rack levers resets an operating member of the tape recorder to stop the operation thereof automatically.

13 Claims, 6 Drawing Figures

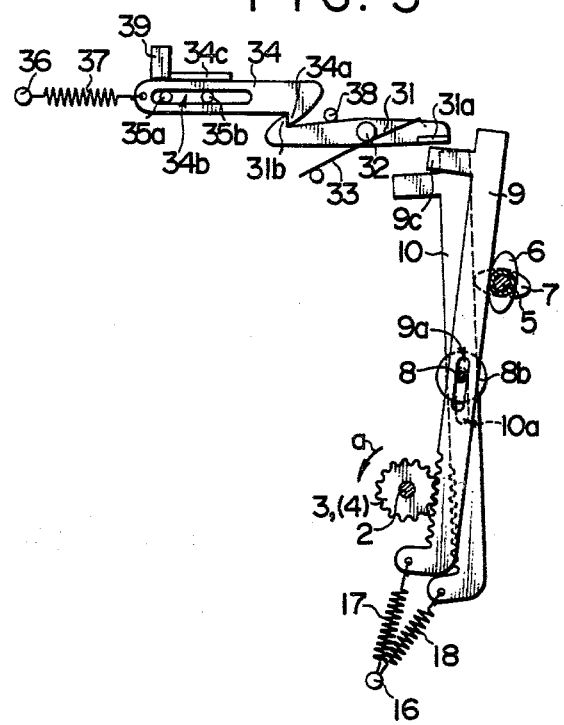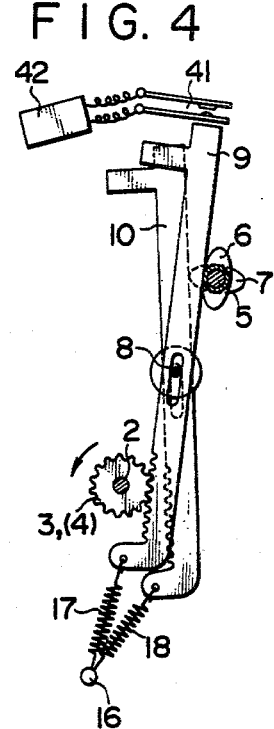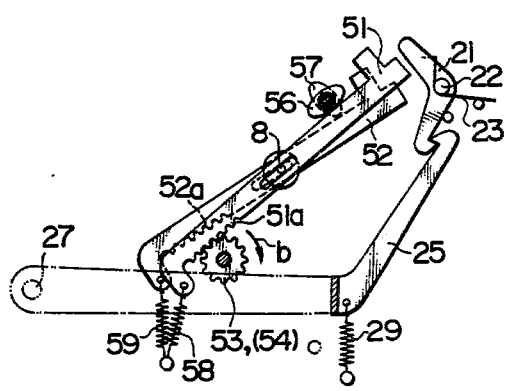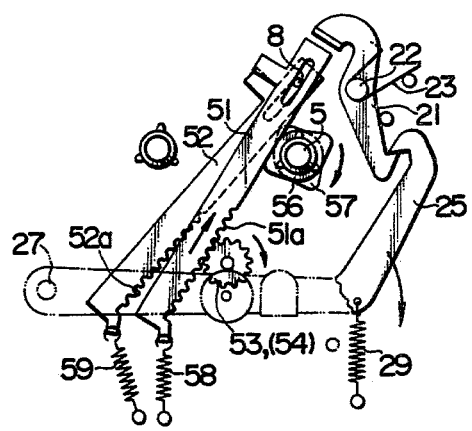

AUTO SHUT-OFF APPARATUS FOR CASSETTE TAPE RECORDER

BACKGROUND OF THE INVENTION

The invention relates to an auto shut-off apparatus for cassette tape recorders, and more particularly to such apparatus which automatically stops the operation of the recorder in connection with the cessation of rotation of the tape rewind or tape supply shaft when a tape end is reached.

A variety of auto shut-off apparatus is known and employed for automatically stopping the operation of the tape recorder when a tape end is reached during a record or playback operation. However, no apparatus has been proposed which achieves a similar function during a tape rewind operation because of the complex arrangement which results.

SUMMARY OF THE INVENTION

It is an object of the invention to provide an auto shut-off apparatus for a cassette tape recorder which automatically stops the operation of the recorder by utilizing a movement of rack levers caused by the rotating capstan in response to the cessation of rotation of either a tape rewind or tape supply shaft when a tape end is reached.

In accordance with the invention, the apparatus is constructed as a simple mechanism comprising a pinion fixedly mounted on a capstan, a cam member fixedly mounted on either tape rewind or tape supply shaft, and rack levers which are driven by the cam member and the pinion. The space requirement is minimized, and therefore the apparatus can be assembled into the recorder. The simple arrangement minimizes the possibility of the failure and reduces the cost. The movement of the rack levers which occurs when a tape end is reached is effective to stop the operation of the tape recorder automatically in any mode thereof including the record, playback, rewind and rapid tape advance modes.

BRIEF DESCRIPTION OF THE DRAWINGS

FIGS. 3 and 4 are plan views of other embodiments; and

FIGS. 5 and 6 are plan views of further embodiments which are applied to a miniature tape recorder which is adapted to play a micro-cassette.

DESCRIPTION OF PREFERRED EMBODIMENTS

The invention will be initially described as applied to a tape recorder which is adapted to play a compact tape cassette. It should be understood that the tape running direction or the direction of rotation of the capstan in a miniature tape recorder is opposite from that in a tape recorder which plays a compact tape cassette. As a consequence, the arrangement of rack levers is different in tape recorders of the two kinds. It is also to be noted that the auto shut-off apparatus of the invention will be described below which is constructed to stop the operation of the tape recorder when a tape end is reached during a tape rewind mode.

Figure 1:
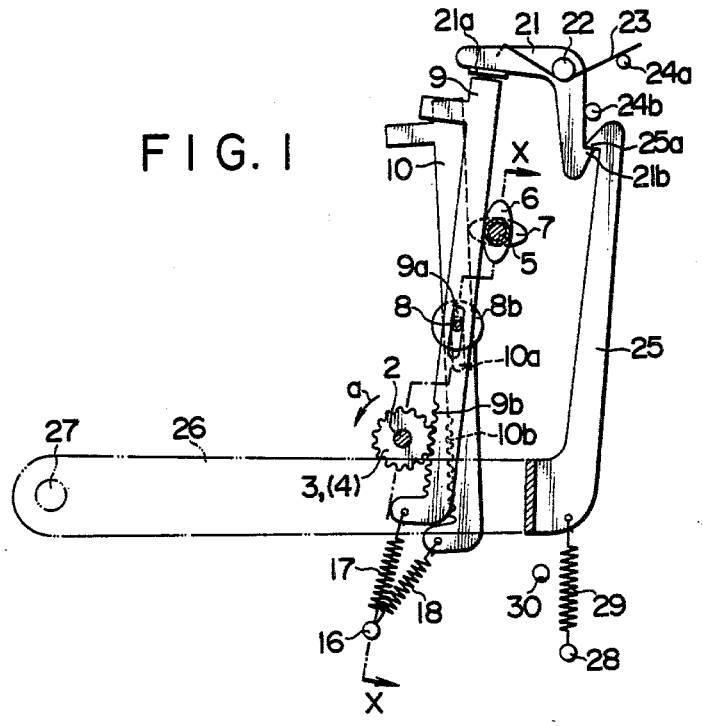
FIG. 1 is a plan view of the apparatus according to one embodiment of the invention as applied to a tape recorder which is adapted to play a compact tape cassette.
Figure 2:
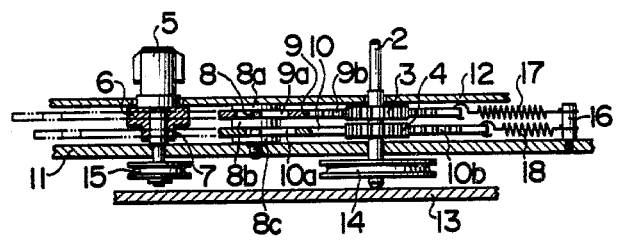
FIG. 2 is a cross section taken along the line X—X shown in FIG. 1.

Referring to FIG. 1, there is shown a plan view of the apparatus according to the invention, as viewed through a panel 12 (see FIG. 2) covering a cassette receiving chamber. A capstan 2 fixedly carries a pair of pinions 3, 4 in a coaxial arrangement, and there is also shown a tape rewind shaft 5 which fixedly carries a pair of elliptical cam members 6, 7 arranged in a coaxial manner. A shaft 8 pivotally mounts a pair of rack levers 9, 10 which engage the pinions 3, 4 and cam members 6, 7, respectively. The shaft 8 extends between a chassis 11, a stationary baseplate of the tape recorder, and the panel 12. The pinions 3, 4 are identical in configuration, and are driven to rotate in a direction indicated by an arrow a together with the capstan 2 by a drive wheel 14 which is located intermediate the chassis 11 and a bottom wall 13 and which is integrally secured to the lower end of the capstan 2. The cam members 6, 7 have an identical elliptical configuration, but have their major axes disposed at right angles to each other, and are fixedly mounted on the lower portion of the rewind shaft 5 intermediate the chassis 11 and the panel 12. A drive wheel 15 is coaxially secured to the lower end of the tape rewind shaft 5 and is connected with the drive wheel 14 through an intermediate transmission member, not shown, for rotation. The rack levers 9, 10 are in the form of elongated strips of an identical configuration and are disposed in parallel relationship to each other between the chassis 11 and the panel 12. The levers are centrally formed with lengthwise elongated slots 9a, 10a which are loosely fitted over the support shaft 8. Spacer pieces 8a, 8b, 8c are fitted on the shaft 8 between the panel 12 and lever 9, between the levers 9, 10 and between the lever 10 and chassis 11 so as to lengthwise move and rotate the levers 9, 10 in their respective horizontal planes.

At one end, the levers 9, 10 are engaged by springs 17, 18, the other end of which springs are anchored to a stationary pin 16, whereby they are urged to move lengthwise and to rotate clockwise about the shaft 8. The lengthwise movement of the levers is limited by the abutment of the edge of the slots 9a, 10a against the shaft 8 while their rotation is limited by the abutment of their lateral edge against the cam members 6, 7. The left-hand side edges of the levers 9, 10 which are located nearer the capstan are formed with racks 9b, 10b, respectively, for meshing engagement with the pinions 3, 4.

Adjacent to the upper end of the levers 9, 10, a detent lever 21 having an inverted L-configuration is rotatably mounted on a shaft 22 which is fixedly mounted on the chassis 11. The end of the horizontal portion of the lever 21 is formed with a driven piece 21a which is folded from the plane of the lever. The other end of the lever 21 is formed with a hook 21b. A torsion spring 23 is disposed on the shaft 22 and has its opposite ends engaged with the horizontal arm of the lever 21 and a stationary pin 24a, thereby urging the lever to rotate counter-clockwise. The resulting rotation is limited by abutment against a stop pin 24b. An L-shaped member 25 is pivotally mounted on a pin 27 and is formed with a hooked end 25a which is adapted to engage the hook 21b. A sliding plate 26 which carries a magnetic head, pinch roller (not shown) and the like is disposed on the horizontal arm of the member 25. A spring 29 extends between the bend of the member 25 and a stationary pin 28 to urge it to rotate clockwise about pin 27. However, the resulting rotation is limited by abutment against a stop pin 30.

The operation of the apparatus will now be described. FIG. 1 shows the position of various parts during a tape rewind mode. The combination of the capstan 2 and the pinch roller, not shown, does not operate to feed the tape, but drive wheel 15, which is connected with the drive wheel 14 on the capstan 2, is driven to rotate the rewind shaft 5, thus rewinding the tape. Since the rewind shaft 5 rotates at a high speed, the portions of cam members 6, 7 having increased length repeatedly push the upper portion of the levers 9, 10 to cause them to rotate counter-clockwise against the resilience of the springs 17, 18. This results in the oscillation of the levers between positions in which the levers are shown in FIG. 1. As a result, the racks 9b, 10b cannot mesh with the pinions 3, 4, and there results no operation which is brought forth by such meshing engagement.

However, when a tape end is reached to interrupt the rotation of the rewind shaft 5, one of the cam members 6, 7, which is cam member 6 in the example shown, comes to a stop in the position shown in FIG. 1, whereby the lever 9 is permitted to rotate clockwise about pin 8 under the resilience of spring 17 to have its rack 9b engaged with the pinion 3. Thereupon, the rotating pinion 3 causes the lever 9 to move upward, whereby its upper end abuts against the driven piece 21a. As a consequence, the detent lever 21 is rotated clockwise about the shaft 22 against the resilience of the torsion spring 23, moving the hook 21b to the left and thus disengaging it from the hooked end 25a of the member 25. Thereupon the member 25 is driven in the downward direction under the resilience of spring 29, causing the sliding plate 26 to return to its original position together with various operating members (not shown) carried thereon. In this manner, the operation of the tape recorder is automatically stopped.

FIGS. 3 and 4 show another embodiment of the invention in which a modified detent lever is used. In FIG. 3, a detent lever 31 is pivotally mounted on a shaft 32 which is fixedly mounted on the chassis 11 (see FIG. 2). The right-hand end of the detent lever is formed with a driven piece 31a which is folded from the plane of the remainder thereof. The driven piece 31a is disposed adjacent to the upper end of the levers 9, 10. The opposite end of the detent lever 31 is formed with a hook 31b, which is engaged by a hooked end 34a of a locking lever 34. In its left-hand portion, the lever 34 is formed with a lengthwise elongated slot 34b, which is engaged by stationary pins 35a, 35b fixedly mounted on the chassis 11, thereby allowing a lengthwise movement of the lever 34. The left-hand end of the lever 34 is engaged by a spring 37, the other end of which is anchored to a stationary pin 36, thus urging the lever 34 to move to the left. The upper edge of the lever 34 is formed with a folded piece 34c which is adapted to terminate a rewind operation by driving a rewind locking member 39. A torsion spring 33 is disposed on the shaft 32 and urges the detent lever 31 to rotate clockwise about the shaft 32. The resulting rotation is limited by the abutment against a stop pin 38.

With this arrangement, when a tape end is reached to interrupt the rotation of the tape rewind shaft 5, one of the levers 9, 10 moves upward, with its upper end 9c driving the driven piece 31a, thereby rotating the detent lever 31 counter-clockwise. As a consequence of this, the hook 31b is disengaged from the hooked end 34a of the lever 34, which is therefore moved to the left under the resilience of the spring 37, with its folded piece 34c driving the rewind locking member 39 to the left and unlocking it to terminate the tape rewind operation. The operating member of the tape recorder is also returned, thus interrupting the operation of the tape recorder.

In FIG. 4, the detent lever is replaced by a normally open power switch 41 which is closed in response to the movement of the rack levers 9, 10 to drive a drive member 42 to stop the rewind operation of the tape recorder. It will be appreciated that various mechanisms can be employed to stop the operation of the tape recorder in response to the movement of the rack levers 9, 10.

FIG. 5 shows an embodiment of the invention which is applied to a miniature tape recorder which employs a miniature tape cassette. As before, the apparatus essentially comprises the pinions 53, 54, cam members 56, 57 and rack levers 51, 52. However, in the present instance, since the capstan 2 rotates in the opposite direction, namely in a direction indicated by an arrow b shown in FIG. 5, rack levers 51, 52 are disposed on the left-hand side of pinions 53, 54 in their lower region, and are disposed on the right-hand side of cam members 56, 57 in their upper region. Racks 51a, 52a are formed in the right-hand edge of the lower portion of the rack levers 51, 52 for meshing engagement with pinions 53, 54, respectively. In their upper region, the left-hand edge of the levers are adapted to abut against the cam members 56, 57. Springs 58, 59 engage the lower end of the levers 51, 52 for causing them to rotate in the counter-clockwise direction. In other respects, the arrangement is similar to that described above in connection with FIGS. 1 and 2, and therefore will not be described.

FIG. 6 shows another modification which is different from the previous embodiments in that pinions 53, 54 and cam members 56, 57 are disposed on the same side of the rack levers 51, 52 while they have been disposed on the opposite sides thereof in the preceding embodiments.

While the described embodiments include a pair of pinions, they can be replaced by a single pinion having an increased thickness to permit the meshing engagement with respective racks on the pair of rack levers. Also, the configuration of the cam members is not limited to an elliptical configuration. The auto shut-off arrangement during the tape feed in the forward direction can be achieved by mounting the cam members on the tape supply shaft.

What is claimed is:
1. Auto shut-off apparatus for a cassette tape recorder comprising:
   a base plate;
   a capstan supported for rotational movement upon said base plate;
   a pinion being rotatably mounted upon said base plate in coaxial alignment with said capstan and being rotated in unison with said capstan;
   an operating member;
   first and second rack levers both normally occupying a first position displaced from said operating member and having a rack portion adapted to meshingly engage said pinion to be linearly moved towards said operating member;
   common pivot means for movably mounting said first and second rack levers upon said stationary base plate;

said first and second rack levers each including a slot cooperating with said pivot means for enabling its associated rack lever to experience swingable and linear movement about said pivot means;

said recorder having at least one shaft adapted to support a tape hub upon which a tape is wound and for rotating said tape hub;

resetting means coaxial with and responsive to rotation of said tape hub to periodically alternately displace said first and second rack levers from meshing engagement with said pinion to thereby return each rack lever to its said first position;

means responsive to a tape end being reached to terminate rotation of said tape hub and hence disable said resetting means, enabling at least one of said rack levers to be linearly moved by said pinion towards said operating member without interruption;

said recorder operating member having a first position for maintaining the recorder in operation and responsive to engagement by one of said rack levers for terminating operation of said recorder when said operating member is displaced from said first position by said one of said rack levers.

2. The apparatus of claim 1 wherein the operating member is adapted to be moved to said first position for activating the tape recorder;

means for locking the operating member in said first position and responsive to engagement by one of said rack levers to unlock the operating member.

3. The apparatus of claim 2 wherein a pinch roller and magnetic head are mounted on said operating member so as to engage the tape in the recorder when the operating member is in said first position.

4. The apparatus of claim 2 wherein said locking means comprises a pivotally mounted arm and bias means for normally urging the pivotally mounted arm towards locking engagement with an end of the operating member.

5. The apparatus of claim 2 wherein the operating member is a power switch is adapted to turn off the driving power for the recorder when engaged by one of said rack levers.

6. An auto shut-off apparatus according to claim 1 wherein said resetting means further comprises first and second rotating cam means for periodically disengaging said rack portions of said first and second rack levers, respectively from said pinion and first and second resilient means for respectively urging said first and second rack levers into engagement with said cam means and for urging said rack portions toward meshing engagement with said pinion which selectively moves said first and second rack levers towards said operating member when said cam means is in a first position and to urge said first and second rack levers away from said operating member when said cam means is in a second position.

7. An auto shut-off apparatus in accordance with claim 1 wherein each slot of said first and second rack levers comprises a centrally located narrow elongated slot; said pivot means comprising a pin extending through both of said narrow elongated slots to enable said first and second rack levers to experience both rotational and translational movement.

8. An auto shut-off apparatus according to claim 1 in which said resetting means includes first and second cam members each being comprised of an elliptical shaped cam disc.

9. The apparatus of claim 1 wherein said resetting means is positioned to slidably engage said first and second rack levers at portions of the rack levers intermediate said pivot means and said rack portions.

10. The apparatus of claim 1 wherein each of said slots is positioned between said rack portion and the portion of said rack lever engaged by said resetting means.

11. The apparatus of claim 8 wherein said first and second cam discs have their major axes disposed at right angles to one another.

12. The apparatus of claim 8 wherein said cam discs have their centers of rotation coaxial with one another.

13. The apparatus of claim 8 wherein the peripheries of said cam discs each slidably engage an associated one of said first and second rack levers.

* * * * *

UNITED STATES PATENT AND TRADEMARK OFFICE
CERTIFICATE OF CORRECTION

PATENT NO. : 4,194,704

DATED : March 25, 1980

INVENTOR(S) : AKIRA OSANAI

It is certified that error appears in the above—identified patent and that said Letters Patent is hereby corrected as shown below:

Column 2, line 16, change "a" to (first occurrence) to --$\underline{a}$--;

Column 3, line 11, after "having" insert --an--;

Column 4, line 21, change "b" to --$\underline{b}$--;

Column 5, line 44, (Claim 5, line 2), after "switch" insert --which--.

Signed and Sealed this

Eleventh Day of November 1980

[SEAL]

Attest:

SIDNEY A. DIAMOND

Attesting Officer

Commissioner of Patents and Trademarks